June 24, 1958 N. L. MOSS ET AL 2,839,963
LIGHT TRANSMISSION INSPECTION DEVICE FOR LIQUIDS
Filed Dec. 6, 1954
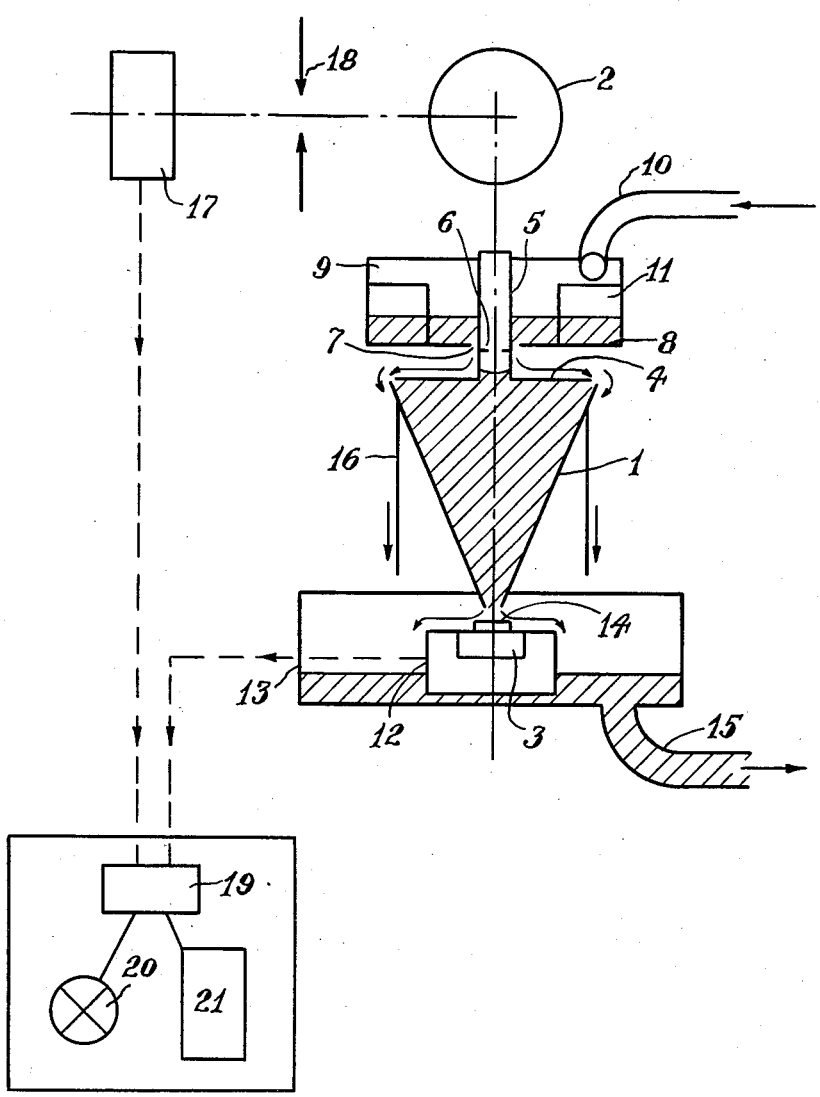
INVENTORS.
Norman Leslie Moss and
Horace Augustus Thomas
BY
Campbell, Brumbaugh, Free & Graves
their ATTORNEYS

United States Patent Office 2,839,963
Patented June 24, 1958

2,839,963

LIGHT TRANSMISSION INSPECTION DEVICE FOR LIQUIDS

Norman Leslie Moss, Eastham, and Horace Augustus Thomas, Bebington, England, assignors to Lever Brothers Company, New York, N. Y., a corporation of Maine Application December 6, 1954, Serial No. 473,420

Claims priority, application Great Britain December 18, 1953

13 Claims. (Cl. 88—14)

This invention relates to optical inspection devices for liquids and in particular to devices for inspecting characteristics such as clarity, optical transmission and the like of continuously flowing liquids.

Optical inspection devices are known which comprise a test chamber embraced by a source of light and a photoelectric cell. The walls of the test chamber are made of transparent material so that light transmitted through the test chamber is reduced by the optical impedance of the transparent walls as well as by the optical impedance of the liquid. The optical impedance of the transparent walls is assumed to remain substantially constant so that variations in the light received by the photoelectric cell are a function of characteristics of the liquid such for example as its clarity and optical transmission.

Though optical inspection devices of the type described above are satisfactory for inspecting small samples of liquid, i. e., the sample contained in the test chamber, they are not satisfactory when used to inspect a continuously flowing liquid. This is due to the surfaces of the transparent walls in contact with the liquid becoming coated with tramp material present in the liquid. This coating increases the optical impedance of the windows and consequently causes errors.

It is an object of the present invention to provide an optical inspection device for continuously flowing liquids in which these errors are greatly reduced.

In accordance with the present invention there is provided a testing device for liquids comprising a light source and light responsive means embracing a chamber through which liquid to be tested is passed continuously. The chamber is formed with an inspection axis in alignment with the light source and the responsive means including an outlet opening from which a stream of the liquid from the chamber issues toward the light responsive means, the latter being provided with a light transparent barrier at angles to the direction of flow and continuously swept clean by the issuing stream. The chamber can be provided with a liquid inlet means which, in conjunction with the outlet, maintains the chamber filled with liquid.

In the preferred arrangement of the invention, the light source, chamber, and light responsive means are arranged on a vertical axis and a gravity liquid feed set up in which a continuous supply of liquid in excess of that which the outlet opening of the chamber is able to discharge is presented to the inlet openings, the excess being flowed, if desired, to a common sump along with the liquid issuing from the chamber. The chamber, so as to present for analysis a column of liquid substantially of uniform length in which new liquid constantly replaces old, can be formed with walls which are downwardly convergent toward the discharge opening and liquid introduced at the upper end through annularly arrayed openings over which liquid passes in quantities exceeding those which can be passed through the chamber. Along the radiation axis at the top of the chamber is formed an open-ended tube carrying an iris diaphragm above the liquid level for masking the edges of the liquid meniscus in the tube.

A preferred embodiment according to the present invention will now be described with reference to the accompanying drawing which shows in section a schematic view of the instrument.

A liquid chamber, which can take the form of an inverted truncated hollow cone 1, is situated below a light source 2 and above a light responsive device such as a photoelectric cell 3. The vertical axis of the cone coincides with a line joining the source 2 and the cell 3.

A flat circular disc 4 provided at its center with a hole, in which a tube 5 is located, is attached at three points to the upper or base end of the cone. The diameter of the disc is slightly smaller than the diameter of the base of the cone thereby providing an annular clearance. A fixed iris 6, fitted in the tube 5, defines the beam of light admitted to the liquid in the chamber and masks any air bubbles which may be carried into the chamber, as these tend to collect at the periphery of the liquid meniscus formed in this tube during normal operation of the instrument. The tube 5 passes through an orifice 7 in the base 8 of reservoir 9, the diameter of the orifice being slightly larger than the external diameter of the tube. The reservoir 9, which is supplied with the liquid to be inspected through an inlet pipe 10, is also provided with radial vanes 11 to reduce to a minimum the circular motion in the liquid.

The cell 3 is enclosed in a liquid-tight case 12 which is situated in a sump 13. The wall of the case 12 above the photo-sensitive surface of the cell is in the form of a glass window 14. If a cell of the type which is enclosed in a glass envelope is used, the glass envelope may constitute the window 14 and case 12. In that case the sump should make a liquid-tight connection with the glass envelope.

In use, the liquid enters the reservoir 9 through the inlet pipe 10 and is so directed by the vanes 11 that it flows uniformly and axially through the orifice 7 at the center of the base 8. The liquid issuing from the orifice 7 flows over the edges of the disc 4 and then through the small annular clearance into the cone. The liquid issuing through the hole at the apex of the cone flows over the glass window 14 above the photoelectric cell and thence into the sump which it leaves via an outlet 15. The cone is maintained full by making the flow from the reservoir greater than that from the cone, the excess being diverted directly to the sump 13 by means of a depending skirt 16 attached to the outside of the cone. This arrangement ensures that the length of the optical path through the liquid is substantially constant, irrespective of wide fluctuations in the rate of liquid flow through the equipment.

The optical system is of the balanced type and comprises, in addition to the aforementioned source 2 and cell 3, a second light responsive device such as a photoelectric cell 17, illuminated directly by the source 2. An adjustable iris 18 is situated between the source 2 and the second cell 17. The two cells 3 and 17 are electrically connected to an electronic comparator 19 which is arranged to actuate an alarm lamp 20 and a recorder 21. In use, when a steady flow of clean liquid through the cone 1 has been obtained, the iris 18 is adjusted until the electrical parameters of the two cells are in balance.

Due to the fact that the height of the liquid in the cone is maintained constant, the quantity of light received by the cell 3 remains constant as long as the optical impedance of the liquid remains constant. Any variations in the optical impedance cause an alteration in the amount of light received by the cell 3. The electrical parameter of the two cells thereupon becomes unbalanced and the electronic comparator 19 actuates the recorder 21. The alarm lamp 20 is arranged to be lit when the unbalance exceeds a predetermined value.

It will be noted that by virtue of the test chamber being in the form of an inverted cone the liquid issuing from the aperture in the apex of the cone flows over the glass window 14, the plane of which is at right angles to the direction of flow, at such a high rate that the window is "self-cleaning." This must be compared with the flow of liquid through a conventional test cell having two windows. In that case, the flow of liquid in contact with the internal surface of the test cell is considerably slower than that at the center of the test cell and the cleaning action, if any, is very small.

In a specific embodiment devised to inspect the clarity of expeller oil filtered by means of a conventional filter press and to detect rupture of the cloth or other press failure, the device had the following dimensions: The cone had a length of 4" (measured along its axis). The diameter of the base of the cone was 3" and of the aperture in its apex 3/16". The apex was situated 1/8" above the glass window. The diameter of the reservoir was 4" and that of the tube 3/4". The diameter of the aperture of the orifice in the plate was 1/2". The annular clearance between the flat disc and the circumference of the base of the cone was 3/32". The bores of the inlet and outlet pipes were 3/8" and 1" respectively.

It will be evident that the cross-section of the truncated cone need not be circular; it may, for example, be oval or triangular. This and other modifications will readily suggest themselves to those skilled in the art. The invention should not, therefore, be thought of as limited except as defined by the following claims.

We claim:

1. In an inspection device for liquid, wall means defining a liquid test chamber having an inspection axis, an outlet orifice in the wall means and on the axis to issue a stream of liquid from the chamber, a light transparent barrier interposed in the stream to be flushed thereby, a light source to form a beam of light along the axis and passing through the barrier, and light inspection means to receive the beam which issues from the source and passes through the stream, the liquid in the chamber and the barrier.

2. An inspection device according to claim 1 including means to maintain a preestablished liquid dimension along the axis between the source and the inspection means, whereby the amount of light impinging on said light inspection means is a function of light transmission through a constant liquid dimension along the light axis.

3. An inspection device according to claim 1, said inspection means comprising photoelectric means, and an indicator including means connected to the photoelectric means and responsive to the output therefrom.

4. An inspection device according to claim 1, said inspection means comprising first photoelectric means, and an indicator including second photoelectric means arranged to receive light from said source, and means responsive to the output of the first and second photoelectric means.

5. In an inspection device for liquid, a liquid test chamber having downwardly convergent wall means, an outlet orifice adjacent the lower end of the chamber for issuing a stream of liquid therefrom, a cover plate at the upper end of the chamber, a tubular portion entering the cover plate and having its axis aligned with said orifice and its lower end no higher than the liquid level in the chamber to establish a liquid meniscus therein, liquid inlet means at the upper end of the chamber adjacent the periphery thereof, an inlet reservoir above the chamber and surrounding the tubular portion, reservoir discharge means to discharge liquid onto the cover plate to flow radially outwardly to the inlet means to the chamber, said reservoir discharge means having a flow capacity exceeding that of the orifice, whereby the test chamber is maintained full of liquid, a light transparent barrier interposed in the liquid stream from the orifice, a light source at one end of the axis defined by the tubular portion, the orifice, and the light transparent barrier, and inspection means at the other end of said axis.

6. An inspection device according to claim 5 including iris means in said tubular portion, whereby the peripheral area of the meniscus formed by the liquid in the tubular portion is masked.

7. An inspection device according to claim 5, said inspection means including a first photoelectric means to receive light from the source passing collectively through the liquid in the test chamber, the tubular portion, the stream issuing from the orifice and the light transparent barrier, second photoelectric means, adjustable light attenuation means situated between the light source and the second photoelectric means, and means responsive to the difference of the outputs of the first and second photoelectric means.

8. An inspection device according to claim 5 including a liquid sump beneath said barrier and beneath said test chamber, and baffle means carried by said test chamber to convey overflow liquid directly to the sump from the region of said inlet means of the chamber.

9. An inspection device according to claim 5, including means to introduce liquid into said inlet reservoir, and baffle means in the reservoir for directing liquid radially inwardly toward the tubular portion and the reservoir discharge means.

10. An inspection device according to claim 5, said reservoir discharge means being defined by the radial space between the tubular portion and the surrounding portion of the inlet reservoir.

11. An inspection device according to claim 5, said liquid inlet means at the top of the test chamber being defined by the radial space between the cover plate and the adjacent portions of the test chamber.

12. An inspection device according to claim 7, said means responsive to the outputs of the first and second photoelectric means comprising a signal comparator affording an output signal when a preestablished input signal ratio obtains.

13. An inspection device according to claim 7, said light source being disposed adjacent the upper end of the tubular portion, and said first photoelectric means being disposed beneath said light transparent barrier.

References Cited in the file of this patent

UNITED STATES PATENTS

| | | |
|---|---|---|
| 814,036 | Gerard | Mar. 6, 1906 |
| 1,900,477 | Wittemeier | Mar. 7, 1933 |
| 2,073,223 | Rose | Mar. 9, 1937 |
| 2,102,282 | Roy | Dec. 14, 1937 |

FOREIGN PATENTS

| | | |
|---|---|---|
| 726,484 | France | Mar. 7, 1932 |
| 837,918 | France | Nov. 28, 1938 |